United States Patent [19]

Furomoto

[11] Patent Number: 4,572,454

[45] Date of Patent: Feb. 25, 1986

[54] FISHING REEL

[75] Inventor: Yoshiyuki Furomoto, Sakai, Japan

[73] Assignee: Shimano Industrial Company Limited, Osaka, Japan

[21] Appl. No.: 593,521

[22] Filed: Mar. 26, 1984

[30] Foreign Application Priority Data

Mar. 30, 1983 [JP] Japan .................................. 58-47184

[51] Int. Cl.⁴ .............................................. A01K 89/02
[52] U.S. Cl. ......................... 242/84.52 B; 242/84.5 R; 310/93
[58] Field of Search .................. 242/84.52 B, 84.52 C, 242/84.5 R, 84.51 R, 84.53; 310/93

[56] References Cited

U.S. PATENT DOCUMENTS

| | | | |
|---|---|---|---|
| 2,347,173 | 4/1944 | Coxe et al. | 242/84.5 R |
| 2,465,932 | 3/1949 | Romine | 242/84.52 B |
| 2,550,861 | 5/1951 | Ransom | 242/84.52 B |

FOREIGN PATENT DOCUMENTS 2092872  8/1982  United Kingdom .......... 242/84.52 B

Primary Examiner—Billy S. Taylor
Attorney, Agent, or Firm—Stevens, Davis, Miller & Mosher

[57] ABSTRACT

A fishing reel wherein a spool having a spool shaft is rotatably supported to a reel body and can be made freely rotatable by a disconnection operation of a clutch mechanism, the fishing reel comprising a magnet brake having an adjusting member and applying a resistance to free rotation of the spool, and a cast-control member contacting with an end face of the spool shaft to impart a rotation resistance to the spool shaft, the adjusting member of the magnetic brake and the cast-control member being arranged at the axially same side of the spool shaft in the reel body. An association means is also provided enabling the cast-control member to be operated upon operation of the adjusting member.

5 Claims, 7 Drawing Figures

FISHING REEL

FIELD OF THE INVENTION

The invention relates to a fishing reel and more particularly to a fishing reel wherein a spool have a spool shaft is rotatably supported to a reel body to be driven to rotate by a drive mechanism and made freely rotatable by a clutch mechanism.

BACKGROUND OF THE INVENTION

Generally, this kind of fishing reel is so constructed that it is operated to engage the clutch mechanism to transmit a driving force from the drive mechanism to the spool through the spool shaft to thereby wind the fishing line onto the spool. In turn, the fishing reel is operated to disconnect the clutch mechanism to make the spool shaft freely rotatable for the purpose of casting.

Upon casting, the fishing line wound onto the spool is drawn out by the aid of weight of a rig put at the utmost end of the fishing line. It happens that the speed of free rotation of the spool becomes higher than that of the fishing line which is drawn out especially at the initial stage of drawing-out of the fishing line immediately after that the fishing line is drawn from the spool and/or at a later stage before the thrown rig hits the water, thereby causing a problem of backlash which loosens or slackens the wound line on the spool so that line snags by itself and is caught between spool and the reel body.

To prevent the backlash of fishing line upon the casting, a conventional solution employs a magnet brake comprising an electric conductor and a magnet, and uses a cast-control member which is adapted to contact with an end face of spool shaft for applying a resistance to rotation of the spool shaft. The magnet brake is so constructed that one of the electric conductor and the magnet is provided at a rotation member such as a spool which rotates together with the spool shaft. The other one is provided at the reel body, and an adjusting member for adjusting a braking force of the magnet brake is mounted to the reel body at one axial end side of the spool shaft, so that one of the electric conductor and the magnet is rotated to produce a rotating magnetic flux which thereby produces an eddy current, which applies a reverse force to rotation of the rotation member according to Fleming's left-hand rule so as to impart a resistance to rotation of the spool.

Meanwhile, the cast-control member is screwed mainly with the reel body and is rotatable to thereby adjust a rotation resistance applied to the spool shaft.

Conventionally, the magnet brake and the cast-control member both are applied to a one fishing reel. The adjusting member of the magnet brake is, generally, provided at the axial one side of the spool shaft in the reel body, and the cast-control member is provided at the axial other side of the spool shaft therein, so that it is impossible to operate unitedly and simultaneously the adjusting member and cost-control member and it is necessary for the angler to shift his grip of the fishing rod supporting the reel so as to selectively operate the two, resulting in a poor control efficiency and inconvenience in use.

In other words, since the magnet brake automatically applies a resitance to the spool correspondingly to rotation thereof thanks to occurence of the eddy current as abovesaid and the braking force of the magnet brake increases in proportion to the speed of rotation of the spool, the brake applies a highest braking force to the spool at the initial stage of drawing-out of the fishng line immediately after that the fishing line is drawn out from the spool when the speed of rotation of the spool becomes highest upon casting. In turn, the braking force becomes lower at the later stage of drawing-out of the fishing line before the thrown fishing rig comes on the water when the speed of rotation of the spool becomes lower in comparison with the abovesaid initial stage.

Meanwhile, the rotation resistance applied by the cast-control member has a magnitude of braking force which can be set freely and optionally. Thus, when it is desired to perform casting most suitably, it is necessary at the initial stage to minimize the braking force by the cast-control member because the braking force by the magnet brake becomes higher at the initial stage immediately after the fishing line is first drawn out from the spool so that the braking force by operation of the magnet brake is enough for the purpose at this stage. In turn, it is necessary at the later stage of drawing-out of the fishing line to operate the cast-control member so as to make up for the smaller magnetic braking force, or operate the adjusting member of the magnet brake so as to increase braking force thereof, because the braking force given by the magnet brake becomes lower at the later stage. In other words, operation of the cast-control member and the adjusting member of the magnet brake should be made upon and during casting, and it is preferable to operate unitedly the cast-control member and the adjusting member in relation with each other. However, each of the adjusting member of the magnet brake and the cast-control member in the conventional reel are provided on opposite sides respectively of the reel body, so that it is hard to perform a most suitable casting.

SUMMARY OF THE INVENTION

The inventor has noticed that for a most suitable casting it is necessary to operate the cast-control member and the adjusting member of the magnet brake upon and during casting, and it is preferable to operate unitedly these components in relation to each other. The invention has been designed with this in mind.

A main object of the invention is to provide a fishing reel wherein the adjusting member of the magnet brake and the cast-control member can be unitedly and simultanously operated at an axial one side of the spool shaft in the reel body. Another object of the invention is to provide an adjustment of the magnet brake by an adjusting member and the adjustment of the rotation resistance imparted by the cast-control member as an associated operation.

In detail, the fishing reel of the invention is characterized in that the adjusting member of the magnet brake is disposed at an axial one end side of the spool shaft in the reel body, and the cast-control member is provided at the same side in the reel body.

Furthermore, the invention is so characterized in that the fishing reel constructed as abovesaid has the adjusting member associated in operation with the cast-control member, and in that the adjusting member is supported on the axis of the spool shaft to be rotatable with respect to the reel body, and further the cast-control member is supported coaxially with the rotation axis of the adjusting member to be rotatable with respect to the reel body. An association means is also provided between the adjusting member and the cast-control member, thereby enabling a united adjustment of these members in relation to each other.

Additionally, the invention is characterized in that the association means can be disengaged to thereby allow the adjustment by cast-control member to be performed independently from the adjustment of the magnet brake, thereby enabling an initial load to be set for a rotation resistance to the spool by use of the cast-control member.

As seen from the above, the fishing reel of the invention is basically characterized in that the cast-control member is provided at the same side portion of the reel body as the one side where the adjusting member is provided, so that when the adjusting member and cast-control member are operated to adjust a rotation resistance to the spool upon and during casting, the operation can be unitedly and simultaneously performed at one side of the reel body without necessity of the angler shifting of his grip of the fishing rod supporting the reel, thereby enabling an easy and convenient operation of the adjusting member and cast-control member.

Additionally, since the association means provided between the adjusting member and the cast-control member enables a unitized operation of these members for adjusting a rotation resistance given to the spool, the control efficiency of the device can be facilitated, thereby enabling the angler to easily perform a most suitable casting.

These and other objects of the invention will be made more apparent from the following description and the attached drawings.

BRIEF DESCRIPTION OF THE DRAWINGS

FIG. 3 is a sectional view of the invention taken on the line III—III in FIG. 1, FIGS. 4 to 6 show a modified embodiment of the invention, wherein

DETAILED DESCRIPTION OF THE INVENTION

Figure 1:
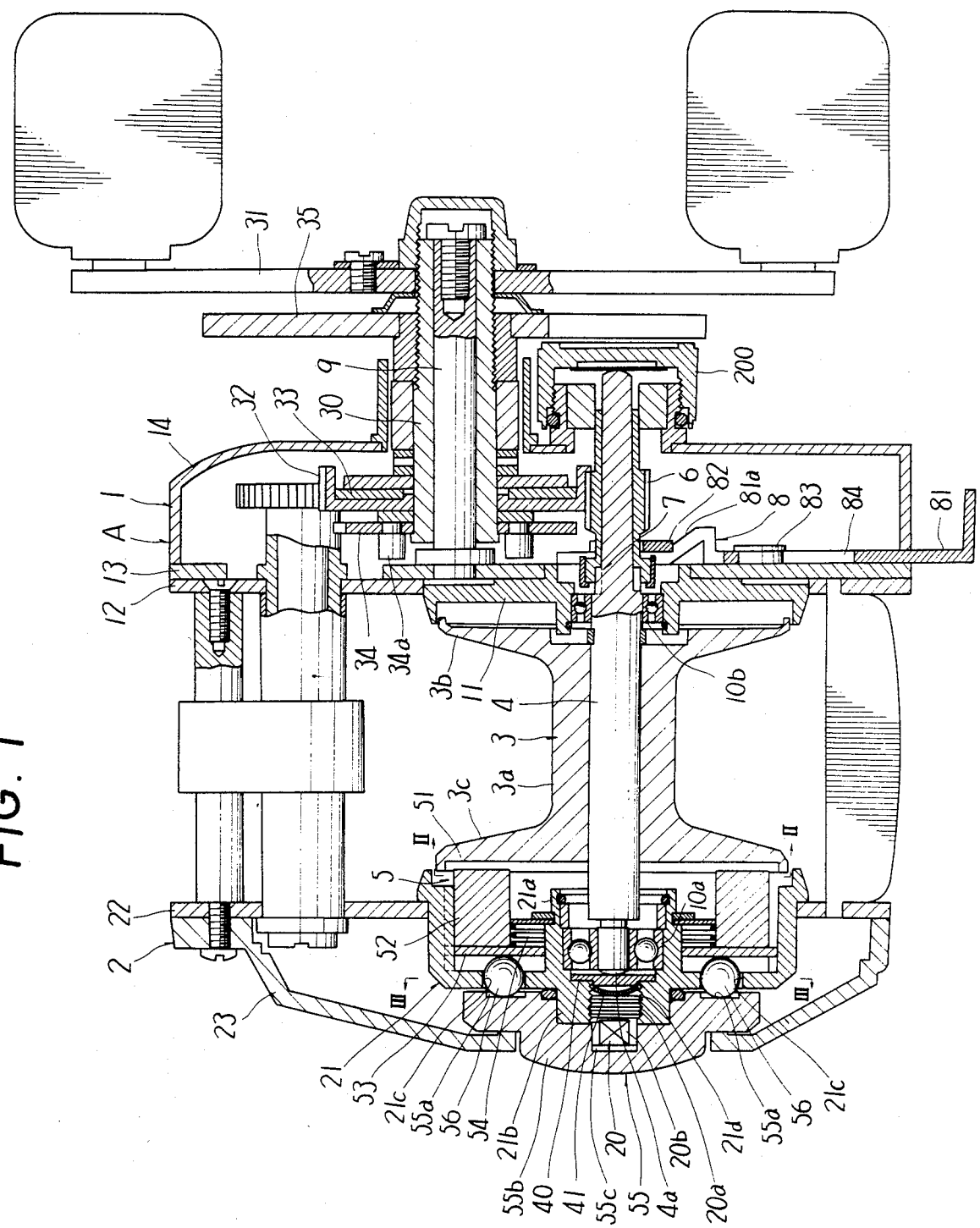
FIG. 1 is a sectional plan view of an embodiment of a fishing reel of the invention.
Figure 2:
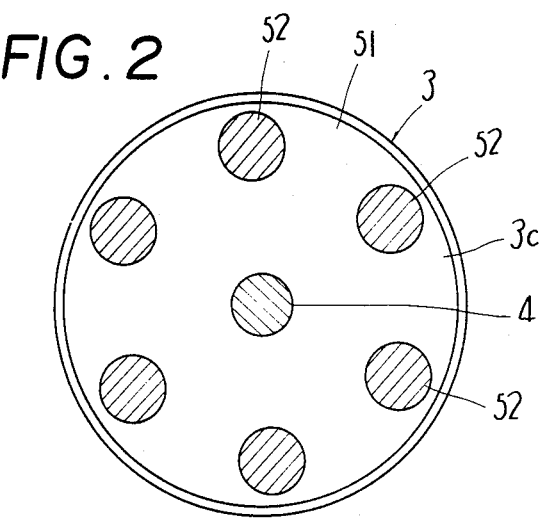
FIG. 2 is a sectional view thereof taken on the line II—II in FIG. 1.
Figure 3:
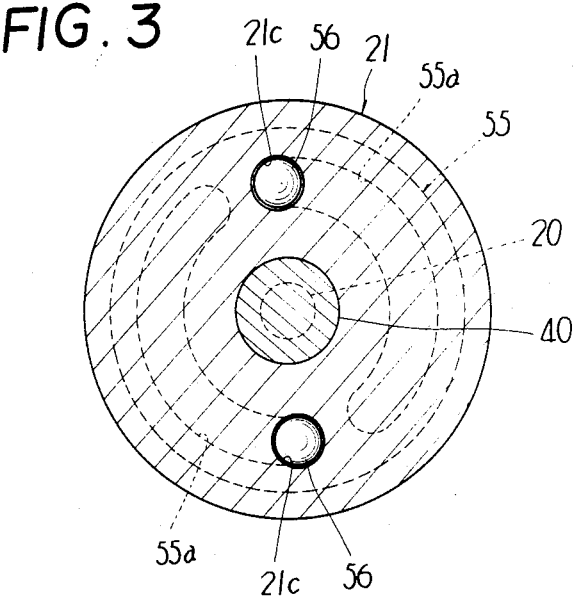

In the drawings, reference numeral A indicates a reel body comprising a pair of first and second side frames 1 and 2 spaced from each other by a predetermined interval. The first side frame 1 comprises a side plate 12 having at the center a bearing housing 11, a doubling plate 13 attached outside of the side plate 12, and a cup-shaped cover 14 attached outside of the doubling plate 13. The second side frame 2 comprises a side plate 22 having at the center a bearing housing 21 and a cup-shaped cover 23 attached outside of the side plate 22. The bearing housing 21 houses therein a magnet brake 5 having an electric conductor 51 and magnets 52 opposite thereto.

A spool shaft 4 having a spool 3 is journaled between the bearing housings 11 and 21 at the first and second side frames by means of bearings 10a and 10b. The end portion of the spool shaft 4 at the first frame side is extended through and outwardly of the first side frame 1 so as to support a pinion gear 6 rotatably and slidably at the middle portion of the extension of the spool shaft within the first side frame 1. Between the pinion gear 6 and spool shaft 4 is provided a clutch mechanism 7 which is operated to engage and disengage by means of a clutch lever 81 which is part of a clutch operating mechanism 8.

A handle shaft 30 is rotatably supported between the doubling plate 13 and the cover 14 at the fist side frame by use of a support shaft 9, and is extended at one end outwardly of the cover 14 so as to support on the extended end a handle 31. A master gear 32 and a frictional plate 33 and a return plate 34 having a plurality of clutch pins 34a are fitted and supported onto the other end of the handle shaft 30.

The frictional plate 33 and return plate 34 cannot rotate with respect to the handle shaft 30 but can rotate together therewith. The master gear 32 is freely fitted onto the handle shaft and is adapted to transmit a rotation force from the handle shaft 30 to the master gear 32 through the frictional plate 33.

The pressing force of the frictional plate 33 with respect to the master gear 32 can be adjusted by a drag knob 35 screwed with the end of the handle shaft 30.

The clutch mechanism 7 is so constructed that the spool shaft 4 is provided at its middle portion with a flat face, and the pinion gear 6 is provided with a tubular portion which has a non-circular inner surface and engages at the inner surface with the flat face of the spool shaft. The tubular portion of pinion gear 6 is operated to disengage from the flat face portion of the spool shaft 4 by operation of the clutch operating mechanism 8 so as to allow the spool shaft 4 and spool 3 fixed thereto to rotate freely.

The clutch operating mechanism 8 comprises a clutch yoke 82 which holds the pinion gear 6 and always biases the same in the direction of engaging the clutch 7, a clutch lever 81 formed in a fork-like shape and having a biasing portion 81a for biasing the clutch yoke 82, and the return plate 34. The clutch lever 81 is supported to the doubling plate 13 of first side frame 1 by means of a pin 83 and an elongate bore 84 to be vertically movable in reciprocation with respect to the spool shaft 4. A return spring (not shown) is provided to bias the clutch lever in the direction of its backward movement, so that the clutch lever 81 when pushed moves the clutch yoke 82 axially to thereby move the pinion gear 6 in the direction of disengaging the clutch 7. In turn, the handle 31 when rotated causes the clutch pins 34a at the return plate 34 to hit a contact member (not shown) provided at an utmost end of the clutch lever 81, so that the clutch lever 81 is returned to its original position by the aid of the return spring, thereby moving by means of the pressing force of the clutch yoke 82 the pinion gear 6 in the direction of engaging the clutch 7.

The clutch lever 81 is swingable around the pin 83 fixed to the doubling plate 13, and has at the utmost end an engaging portion which is engaged with a stepped portion of a cut-out provided at the doubling plate 13 to hold the clutch lever 81 at a terminus position of its forward movement.

The spool 3 comprises a cylindrical trunk portion 3a and a pair of flanges 3b, 3c projecting at both ends of the trunk portion 3a, and is formed of, for example, aluminum.

The magnet brake 5 is so constructed that the electric conductor 51 is formed integrally with the flange 3c at one side of the spool 3. A holding member 53 which is not magnetic is mounted to the outer peripheral surface of support cylinder 21a provided at the center of the bearing housing 21 to be movable only axially of the spool shaft 4. At one side face of the holding member 53 are held peripherally a plurality of the magnets 52 which are spaced at predetermined intervals and opposite to the electric conductor 51 in the axial direction of the spool shaft 4. A spring 54 is provided between the holding member 53 and the support cylinder 21a to bias the holding member 53 in the direction of moving the magnets 52 away from the electric conductor 51. The bearing housing 21 is provided at the outer part of the bottom wall with a supporting portion 21b, and a circular adjusting member 55 is supported to the supporting portion 21b to be coaxial with the axis of the spool shaft 4 and rotatable only. The adjusting member 55 has at an axial one side face arcuate cam faces 55a, 55a, which extend along the periphery and are slanted along the axis of the spool shaft. The adjusting member 55 is provided with an operating knob 55b which is exposed outwardly of the cover 23 and is used for rotating the adjusting member. Rolling members 56, 56 engageable with the cam faces 55a, 55a are held at window bores 21c, 21c formed at the bottom wall of the bearing housing 21 to thereby contact with an outer surface of the holding member 53, so that the adjusting member 55 when rotated causes the holding member 53 to move axially to thereby adjust the intervals between the electric conductor 51 and the magnets opposite thereto so as to adjust a rotation resistance (a braking force) applied to the spool 3.

In the fishing reel constructed as abovesaid, a threaded bore 21d is formed at the central portion of the bearing housing 21 at the second side frame 2, i.e., on the same axis as the rotation axis of the adjusting member 55. A cast-control member 20 is adapted to be screwed with the threaded bore 21d to contact with an axial one end face 4a of the spool shaft 4 and apply a resistance to rotation of the spool shaft. At the center of the adjusting member 55, which is supported only rotatably to the bearing housing 21 is fitted the end portion of the cast-control member 20. Cast-control member 20 is not-rotatable with respect to adjusting member 55 and is relatively movable with respect thereto axially of the spool shaft 4, so that the cast-control member 20 can be operated in association with operation of the adjusting member 55. Hence, when the adjusting member 55 is rotated in the direction of increasing the braking force of the magnet brake 5, the cast-control member 20 is moved relatively to the adjusting member 55 in the direction of moving away from the one end face 4a of the spool shaft 4. In turn, when the adjusting member 55 is rotated in the direction of lowering the braking force of the magnet brake 5, the cast-control member 20 is moved relatively to the adjusting member 55 in the direction of approaching the end face 4a of the spool shaft 4.

The cast-control member 20 comprises a shaft portion which is provided at the outer periphery of the one end with a threaded portion 20a and at the outer periphery of the other end with a fitting portion 20b having a flat face for restricting rotation of the cast-control member with respect to the adjusting member.

The threaded portion 20a is screwed with the threaded bore 21d at the bearing housing 21, and the fitting portion 20b is fitted into a fitting bore 55c provided at the center of the adjusting member 55, so that the fitting portion 20b and the fitting bore 55c constitute an association means.

Between the cast-control member 20 and the one end face 4a of the spool shaft 4 as shown in the drawings is provided a holder 40 formed of a metal plate such as a phosphorus bronze plate or montifiere metal which is adapted to receive the end face of spool shaft, and a leaf spring 41. The holder 40 and leaf spring 41 are movable axially of the spool shaft 4.

When there is no need to increase a distance of casting of fishing line, the adjusting member 55 is operated to rotate in the direction of approaching the magnets 52 to the electric conductor 51, thereby reducing the interval therebetween to increase the braking force of the magnet brake, so that the high-speed rotation of the spool 3 at the initial stage of drawing-out of the fishing line is restrained. In this instance, according to the rotation of the adjusting member 55, the cast-control member 20 is also rotated in association with and correspondingly to the rotation of the adjusting member 55 to thereby move relatively thereto in the direction of moving away from the one end face 4a of the spool shaft 4, thereby lowering the rotation resistance applied to the spool shaft 4 by the cast-control member 20.

In turn, when it is desired to increase the casting distance, the adjusting member 55 is operated to rotate in the direction of moving the magnets 52 away from the electric conductor 51, thereby enlarging the interval therebetween to lower the braking force of the magnet brake, so that even when the spool 3 makes a high-speed rotation at the initial stage of drawing-out of the fishing line, the braking force can be a minimum. In the above-said operation, the cast-control member 20 also rotates in association with and corresponding to rotation of the adjusting member 55 as the aforesaid case. But, this time it provides a reverse operation, i.e., the cast-control member 20 moves, relatively to the adjusting member, in the direction of approaching one end face 4a of the spool shaft 4, thereby applying a larger rotation resistance to the spool shaft 4, whereby the rotation resistance applied to the spool shaft 4 by the cast-control member 20 can prevent the backlash of the drawn fishing line at the later stage of drawing-out of the fishing line.

Since the adjusting member 55 and the cast-control member 20 are coupled for associated movement, an angler when casting can rotate the adjusting member 55 of the magnet brake so as to adjust the braking force thereof, while simultaneously and unitedly adjusting the rotation resistance applied to the spool shaft 4 by the cast-control member 20, thanks to a relative movement of the cast-control member with the operation of the adjusting member of the magnet brake, so that it is not at all necessary for the angler to separately operate the cast-control member 20.

The brake 5 functions such that the electric conductor 51 integrally formed with the spool 3 rotates within a magnetic field of the magnets 52 to thereby change the direction of magnetic flux passing through the electric conductor 51 along the direction of rotation thereof, thereby causing an eddy current at the conductor 51 to produce a force in an opposite direction to the direction of rotation of the conductor 51 according to Fleming's left-hand rule, thereby applying a resistance to rotation of the spool 3. Additionally, when the adjusting member 55 is rotated, operation force from rotation of the adjusting member is transmitted from the cam faces 55a, 55a to the holding member 53 through the rolling members 56, 56 to change the engaging position thereof on the cam faces 55a, 55a to thereby consequently move axially the holding member 53 with respect to the support cylinder 21a, thereby displacing the magnets 52 held on the holding member 53 with respect to the conductor 51 so as to change the density of magnetic flux passing through the conductor 51, so that the braking force applied to the spool 3 can be adjusted.

Figure 4:
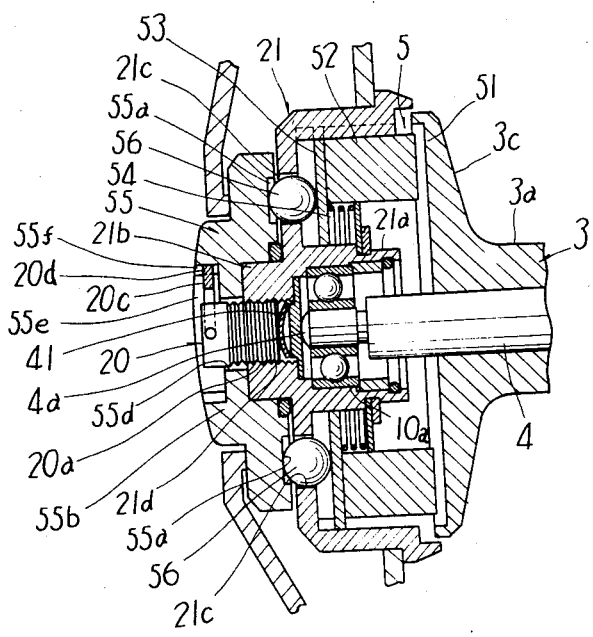
FIG. 4 is a partially-omitted cross-sectional plan view thereof.

In the above embodiment, the cast-control member 20 is associated with the operation of the adjusting member 55 of the magnet brake, but alternatively it may be adapted to be operated independently. In this case, as shown in FIG. 4 for example, the adjusting member 55 is provided at the central portion with a through bore 55d through which the cast-control member 20 is fitted to be exposed outwardly of the adjusting member 55. At the exposed portion of the cast-control member is provided a controller 20c by which the cast-control member can be operated outside.

Figure 5:
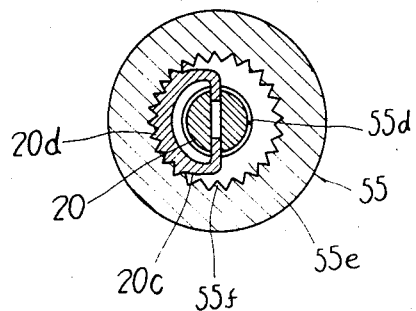
FIG. 5 is a longitudinal sectional side view of the invention.
Figure 6:
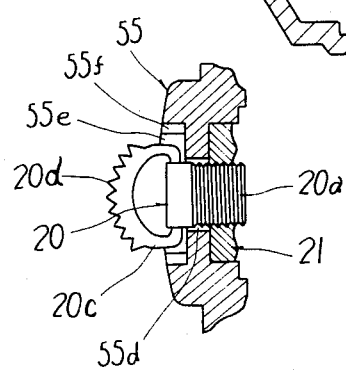
FIG. 6 is an explanatory view showing the controller of the cast-control member in the rising condition.

Furthermore, the cast-control member 20 can be adapted to be operated in association with the operation of the adjusting member 55 while, simultaneously, being operable independently therefrom. In this case, as shown in FIG. 4 the adjusting member 55 is provided at the outer surface with a circular recessed portion 55e in continuation with the through bore 55d. The recessed portion 55e is provided, as shown in FIG. 5, at the inner peripheral surface with a number of ridges and grooves 55f, and controller 20c is pivoted to the cast-control member 20 to rise and fall down with respect thereto. The controller 20c is, as shown in FIGS. 5 and 6, provided at the utmost end with ridges and grooves 20d which are engageable with the ridges and grooves 55f and constitute therewith an association means. Accordingly, the controller 20c can be operated to fall down, as shown in FIGS. 4 and 5, to engage the ridges and grooves 20d with the ridges and grooves 55f, thereby making an association between the adjusting member 55 and the cast-control member 20 by means of the controller 20c. In turn, the controller 20c can be operated to rise, as shown in FIG. 6, to disconnect the association.

In this construction, since the association can be disconnected by raising the controller 20c as shown in FIG. 6, the cast-control member 20 can be operated independently from the adjusting member 55, so that an initial load for the rotation resistance applied to the spool 3 can be set freely and optionally by the cast-control member 20. Additionally, the abovesaid association through the controller enables the cast-control member to adjust the rotation resistance corresponding to and in association with the operation of the adjusting member 55.

Figure 7:
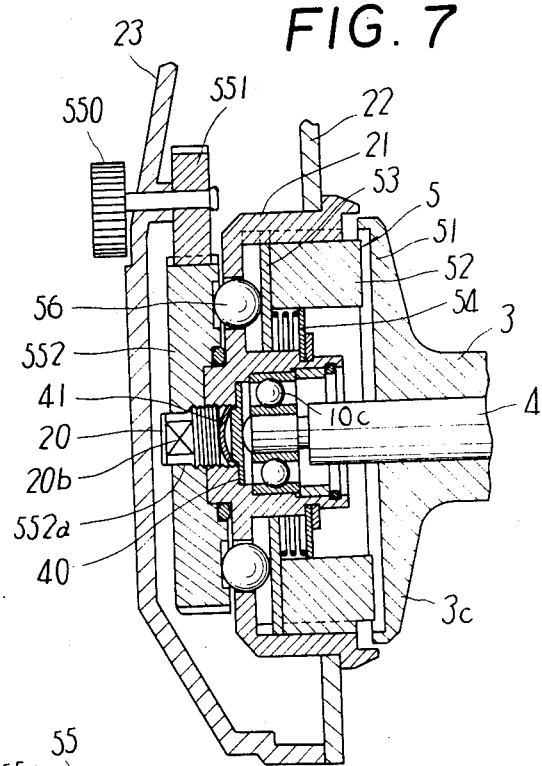
FIG. 7 is a partially-omitted cross-sectional plan view showing a further modified embodiment of the invention.

In each of the above described embodiments, the adjusting member 55 is rotatably supported on the axis of the spool shaft 4, and the rotation axis of the adjusting member 55 is set coaxially with the rotation axis of the cast-control member 20. Alternatively, an adjusting member 550 may be adapted as shown in FIG. 7 to be displaced with respect to the axis of the spool shaft 4. In this case, the adjusting member 550 is provided with a gear 551, and there may be provided an association gear 552 which is engageable with the gear 551 and rotatably supported within the bearing housing 21, so that the adjusting member 550, when operated, rotates the association gear 552 so as to adjust the braking force of the magnet brake 5.

In this construction, the cast-control member 20 is screwed with the portion of the bearing housing 21 as in the foregoing embodiments. To associate the cast-control member 20 with the adjusting member 550, the association gear 552 may be provided with a non-circular fitting bore 552a into which the non-circular fitting portion 20b of cast-control member 20 is fitted as in the FIG. 1 embodiment.

As seen from the above, it is apparent that the positions for mounting the adjusting members 55, 550 are not limited but can be set freely and optionally, so that the positions should not be limited only to those of the abovesaid constructions.

Furthermore, in the shown embodiments, the adjusting member 55 and cast-control member 20 are formed at the second side frame 2, but alternatively may be formed at the first side frame 1.

Additionally, an auxiliary cast-control member 200 for an auxiliary use may be provided separately from the cast-control member 20, as shown in FIG. 1, to be set at the opposite side of the reel body A to the one side thereof where the cast-control member 20 is formed. In this case, the initial load for rotation resistance applied to the spool shaft 4 as in the embodiment shown in FIG. 1 can be set by use of the auxiliary cast-control member 200.

It should be understood that the specific practices and preferred embodiments herein referred to have been offered by way of exemplary disclosure rather than limitation, and that various modifications, additions and substitutions may be effected without departure from those spirit and scope of the invention which is defined in the appended claims.

What is claimed is:

1. A fishing reel comprising:
    a reel body,
    a spool supported rotatably to said reel body and having a spool shaft,
    a drive mechanism for driving said spool,
    a clutch mechanism for making said spool freely rotatable with respect to said drive mechanism,
    a magnet brake comprising an electric conductor and magnets for applying a rotation resistance to said spool upon free rotation of said spool, said magnet brake being provided with an adjusting member for adjusting a rotation resistance imparted to the free rotation of said spool, said adjusting member being disposed at an axial one end side of said spool shaft in said reel body,
    a cast-control member adapted to contact with an end free of said spool shaft at said axial one end side thereof so as to apply a rotation resistance to said spool shaft, said cast-control member being provided at the same side of said reel body as said one side where said adjusting member is disposed, and an association means provided between said adjusting member and said cast-control member for producing an operation of said cost-control member upon operation of said adjusting member.

2. A fishing reel according to claim 1, said association means comprises means for causing an adjustment of said magnet brake by said adjusting member and an adjustment of rotation resistance by said cast-control member to function reversely to one another such that when braking force of said magnet brake is increased, a rotation resistance applied to said spool shaft by said cast-control member is lowered, and when braking force of said magnet brake is reduced, a rotation resistance applied to said spool shaft by said cast-control member is increased.

3. A fishing reel according to claim 1, wherein said adjusting member is supported on the axis of said spool shaft to be rotatable with respect to said reel body so that said adjusting member, when operated, can rotate to adjust a rotation resistance applied by said magnet brake to free rotation of said spool, and said cast-control member is supported coaxially with the rotation axis of said adjusting member to be rotatable with respect to said reel body so that said cast-control member, when operated, can rotate to adjust a rotation resistance applied to said spool shaft.

4. A fishing reel according to claim 1, wherein said cast-control member is provided with a controller which enables said cast-control member to be operable independently of said adjusting member.

5. A fishing reel according to claim 4, wherein said controller is pivoted swingably with respect to said cast-control member, said controller being selectively swingable to a position where said cast-control member can be operated independently of said adjusting member and to another position where said cast-control member is operable upon operation of said adjusting member.

* * * * *